(12) United States Patent  
Gretz

(10) Patent No.: US 9,391,438 B1  
(45) Date of Patent: Jul. 12, 2016

(54) ELECTRICAL BOX EXTENDER WITH BREAKAWAY FLANGE

(71) Applicant: Arlington Industries, Inc., Scranton, PA (US)

(72) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 14/839,937

(22) Filed: Aug. 29, 2015

Related U.S. Application Data

(60) Provisional application No. 62/087,848, filed on Dec. 5, 2014.

(51) Int. Cl.
*H02G 3/12* (2006.01)
*H02G 3/08* (2006.01)

(52) U.S. Cl.
CPC . *H02G 3/12* (2013.01); *H02G 3/081* (2013.01)

(58) Field of Classification Search
USPC .......................................................... 174/53
See application file for complete search history.

(56) References Cited

U.S. PATENT DOCUMENTS

| | | | | |
|---|---|---|---|---|
| 1,557,066 A | * | 10/1925 | Krantz ................... | H02G 3/081 220/3.94 |
| 2,850,202 A | * | 9/1958 | Schneider .............. | B21D 51/52 220/3.2 |

* cited by examiner

*Primary Examiner* — Dhirubhai R Patel

(57) ABSTRACT

An electrical box extender for repositioning an electrical box level with a newly installed wall surface. The box extender is a one-piece device including a frame member with rearward-extending sidewalls and corner members extend. A peripheral flange extending along the outer edge of the frame member includes an outward extending end flange. End flanges include an outer edge and side edges with the side edges including a plurality of paired side notches therein. Each paired side notch is in axial alignment with a plurality of slots extending along the end flange. A row of axially-aligned slots are aligned with an associated pair of side notches. Each row of axially-aligned slots and their associated notches defines breakaway flange portion on the end flange. The breakaway flange portions can be left intact or removed as needed for mounting of either a standard, mid-size, or max-size cover plate.

14 Claims, 7 Drawing Sheets

ELECTRICAL BOX EXTENDER WITH BREAKAWAY FLANGE

CROSS-REFERENCE TO RELATED APPLICATIONS

This application claims priority to provisional U.S. Application No. 62/087,848, filed Dec. 5, 2014, the contents of which are incorporated herein by reference in their entirety.

FIELD OF THE INVENTION

The present invention relates to mounting of electrical components to walls and similar surfaces and specifically to an electrical box extender for insertion into an existing electrical box to bring it flush with a newly installer surface.

BACKGROUND

As houses age, homeowners oftentimes upgrade bathrooms, kitchens, and other areas of their homes by installing a new wall surface or covering. Installation of the new wall surface typically causes all electrical components, such as duplex outlets and light switches, and their associated electrical boxes to become recessed within the new wall and can lead to an unsafe condition in which the cover plate does not seal around the electrical box. In order to remedy this situation, the homeowner can reinstall all the electrical boxes with their components level with the newly installed surface. However, this option is labor intensive and time consuming, and usually requires the services of a certified electrician.

Recently, to accommodate the needs of homeowners, manufacturers are providing electrical box cover plates in various sizes, such as standard, mid-size, max-size. Although various devices have been proposed for bringing electrical boxes level with newly installed walls, these devices are limited for use in repositioning a standard size cover plate and their use in installing mid-size and max-size cover plate requires extensive and time consuming modification at the job site.

Accordingly, what is needed is an apparatus and method that enables simple and effective repositioning of an electrical box to render its installed component level with a newly installed wall.

BRIEF SUMMARY OF THE INVENTION

The present invention is an electrical box extender that can be used to reposition electrical boxes level with a newly installed wall surface. The electrical box extender is a one-piece device that is easily adaptable for mounting of various sized cover plates. The box extender includes a frame member with a planar rear surface and rearward-extending sidewalls. A corner member extends between each adjacent sidewall. A peripheral flange extending along the outer edge of the frame member includes a side portion and an end portion. An end flange extends outward from the end portion of the peripheral flange. Corner members extend from a planar edge that is substantially parallel to the planar rear surface of the frame member. Corner members are narrow at the planar edge and gradually widen to their widest dimension at their inner edges. End flanges include an outer edge and side edges with the side edges including at least one pair of side notches therein. Each paired side notch is in axial alignment with a plurality of slots extending along the end flange. Preferably the end flanges include an outer row and inner row of axially-aligned slots each in alignment with an associated pair of side notches. The outer row of axially-aligned slots defines a first breakaway flange portion on the end flange and the inner row of axially-aligned slots defines a second breakaway flange portion. The breakaway flange portions can be left intact or removed as needed for mounting of either a standard, mid-size, or max-size cover plate.

OBJECTS AND ADVANTAGES

A first object of the invention is to provide an electrical box extender for repositioning an electrical box and its installed electrical component in order to be level with a newly installed wall.

A second object of the invention is to provide an electrical box extender that is easily adaptable for accommodating electrical cover plates of various sizes.

A further object of the invention is to reduce the amount of time and labor involved in releveling an electrical box with a newly installed wall.

A further object of the invention is to provide an electrical box extender that can be secured to an electrical box to create a sealed enclosure with the box.

These and other objects and advantages of the present invention will be better understood by reading the following description along with reference to the drawings.

DETAILED DESCRIPTION

Figure 1:
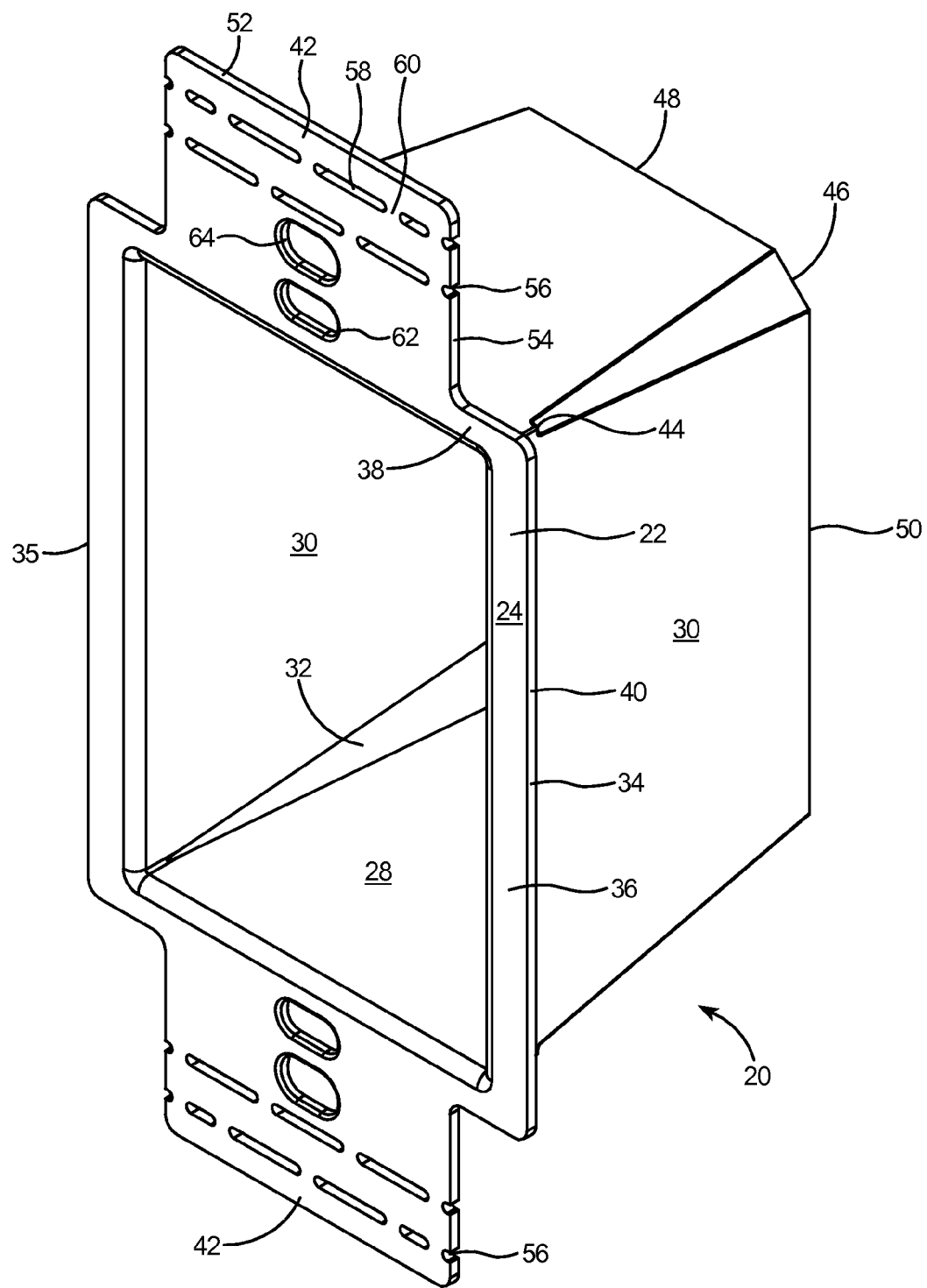
FIG. 1 is a front isometric view of the preferred embodiment of an electrical box extender with breakaway flange according to the present invention.

With reference to FIG. 1 there is shown a preferred embodiment of an electrical box extender with breakaway flange according to the present invention. The box extender 20 is a one-piece flexible member that may be inserted into an existing electrical box to bring it flush with a newly installer surface, such as when the interior walls of a building are recovered or renovated. The box extender is adapted to accommodate any of three commonly used cover plates including a standard cover plate, a mid-size cover plate, and a max-size cover plate.

Figure 2:
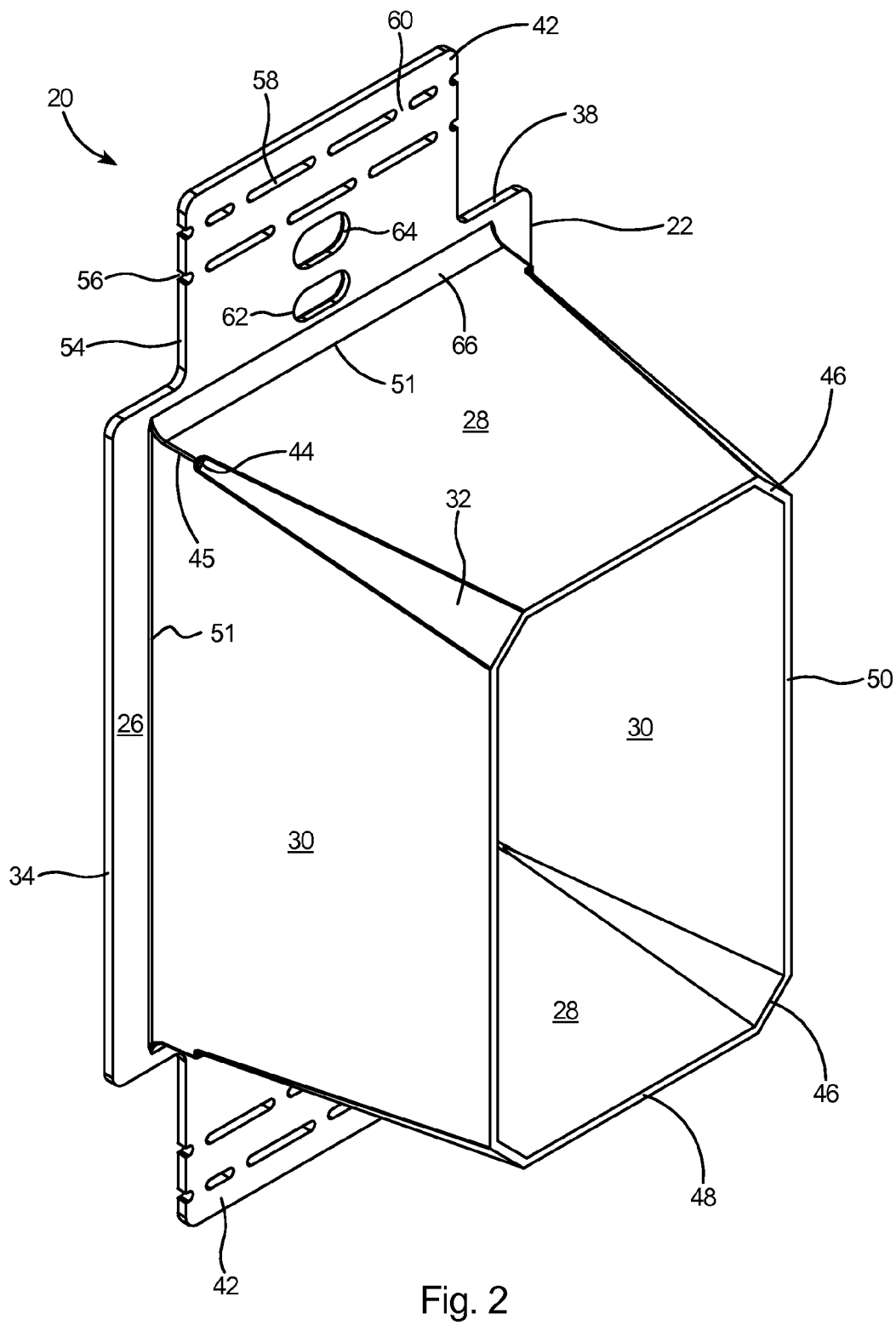
FIG. 2 is a rear isometric view of the electrical box extender of FIG. 1.

As shown in FIGS. 1 and 2, the one-piece box extender 20 includes a frame member 22 with a planar top surface 24, and a planar rear surface 26. Two short sidewalls 28 and two long sidewalls 30 extend from the rear surface 26 of the frame member 22. A corner member 32 extends between each adjacent short sidewall 28 and long sidewall 30. A peripheral flange 34 extends along the entire outer edge 35 of the frame member 22 and includes a side portion 36 and an end portion 38. The side portion 36 terminates in an outer flange edge 40 along the side of the long sidewalls 30. An end flange 42 extends outward from the end portion 38 of the peripheral flange and is centrally located thereon. Corner members 32 extend from a planar edge 44 at the junction 45 of the sidewalls 28 and 30, the planar edge 44 being parallel to the planar rear surface 26 of the frame member 22. Corner members 32 are narrow at planar edge 44 and gradually widen to their widest dimension at their inner edges 46. Inner edges 46 of corners 32 are planar with inner edges 48 of short sidewalls 28 and inner edges 50 of long sidewalls 30. The short sidewalls 28 and long sidewalls 30 are wide at their base edges 51 adjacent the peripheral flange 34, and gradually narrow to their narrowest dimension at their inner edges 48 and 50. The shape of the sidewalls 28 and 30, narrowing in dimension at their inner edges 48 and 50, facilitate insertion of the electrical box extender into an existing electrical box (not shown). When inserted into an electrical box, the sidewalls 28 and 30 will cooperate with the back wall of an electrical box to form an enclosure for electrical components and their associated conductors. Furthermore the electrical box extender 20 is preferably molded in one piece of plastic, with the sidewalls 28 and 30 including a thickness of no more than 0.040-inch to render the sidewalls substantially flexible such that they will flex inward to enable an installer to press them into an existing electrical box for purposes of bringing the box and its electrical component level with a newly installed wall.

End flanges 42 include an outer edge 52 and side edges 54 with the side edges 54 including at least one pair of side notches 56 therein. Each paired side notch 56 is in axial alignment with a plurality of slots 58 extending along the end flange 42. The slots 58 are separated by a plurality of narrow bridges 60. An inner aperture 62 and outer aperture 64 are provided in each end flange 42 interior of the slots 58 and side notches 56. A rounded edge 66 is provided at the juncture of the frame member 22 and each of the sidewalls 28 and 30.

Figure 3:
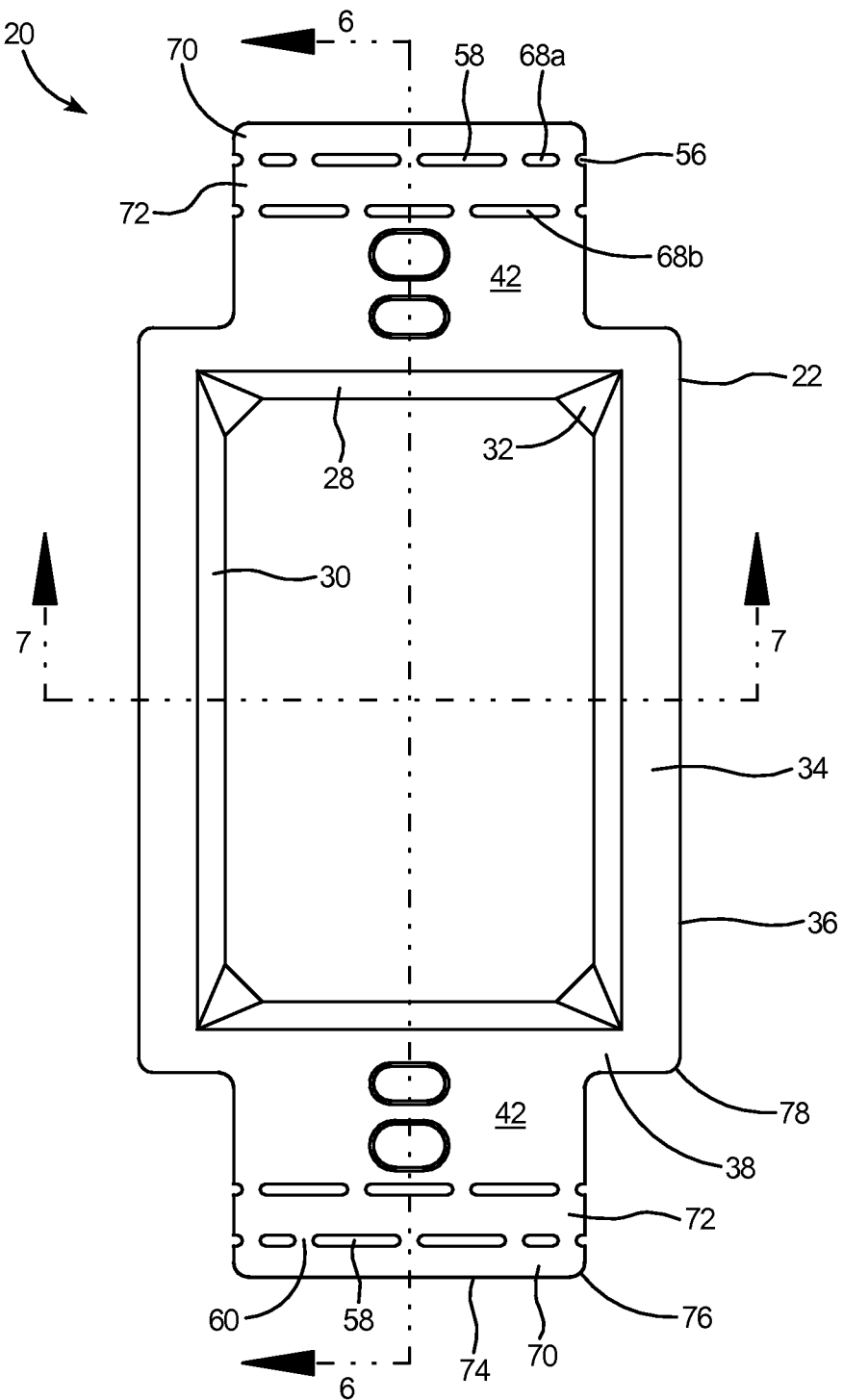
FIG. 3 is front elevation view of the electrical box extender.

As shown in FIG. 3, the notches 56 are preferably of semi-circular shape. In the embodiment shown in FIG. 3, there are two rows 68a, 68b of axially-aligned slots 58 and two pairs of side notches 56. The outer row 68a of axially-aligned slots 58 defines a first breakaway flange portion 70 on the end flange 42. The inner row 68b of axially-aligned slots 58 defines a second breakaway flange portion 72 on the end flange 42. End flanges 42 include a planar outer edge 74 and rounded corners 76. Peripheral flange 34 includes rounded corners 78 at the juncture of the side portion 36 and end portion 38. The bridges 60 in the outer row 68a of axially-aligned slots 58 are offset from the bridges in the inner row 68b of axially-aligned slots 58 in order to maintain strength and integrity of the end flanges 42 across their total width, so that end flanges 42 maintain their strength and are not weakened unless purposely scored by an installer in order to remove one of the breakaway portions 70 or 72.

Electrical cover plates commonly include plates of standard size, mid-size, and max-size. The breakaway flange portions 70 and 72 provide the electrical installer with a convenient means to adapt the box extender 20 to accommodate any size cover plate. The box extender 20 of the present invention is used in an old work situation to bring the existing electrical box flush with the newly installed surface in order to meet the electrical code requirements and, with the electrical box provide a secure enclosure for all inner box wiring. The electrical box extender also provides a convenient means for the installer to adapt the extender to fit any size of cover plate. The breakaway flange portions 70 and 72 are preferably removed by scoring along the axially aligned slots 58 with a utility knife or similar tool and then bending the flange portion that will be removed. The side notches 56 provide a convenient point for starting the blade after which it can be extended through the axially aligned slots 58 to cut the narrow bridges 60 separating the slots.

With reference to FIG. 3, if the installer intends to mount a standard size cover plate to the box extender 20, the second breakaway flange portion 72 of the end flanges 42 are removed, which will enable the underlying box extender to be covered by the standard size cover plate with no portion of the end flange 42 extending from the periphery of the cover plate. If the installer intends to mount a mid-size cover plate to the box extender 20, the first breakaway flange portion 70 of each end flange 42 is removed. If the installer intends to mount a max-size cover plate to the box extender 20, the end flanges 42 are left intact.

Figure 6:
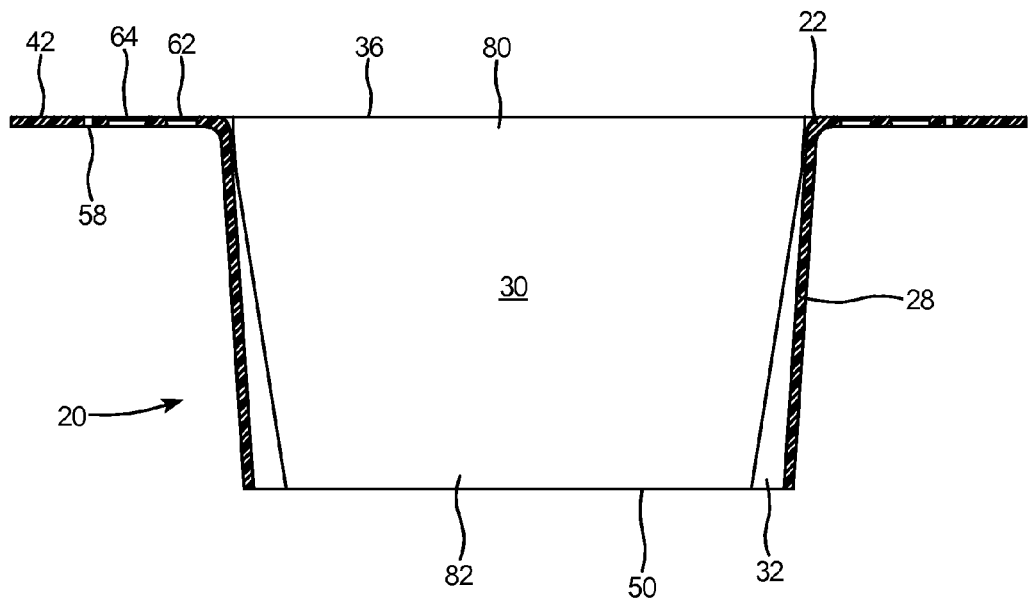
FIG. 6 is a sectional view of the electrical box extender taken along line 6-6 of FIG. 3.
Figure 7:
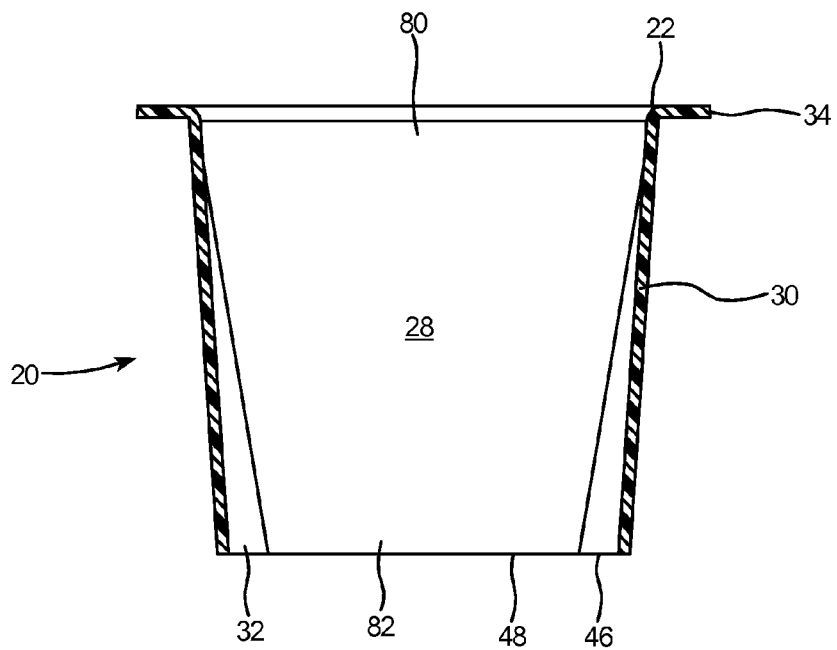
FIG. 7 is a sectional view of the electrical box extender taken along line 7-7 of FIG. 3.
Figure 6A:
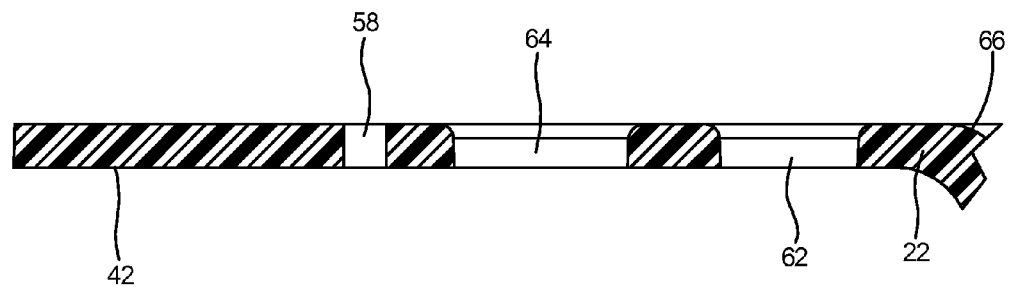
FIG. 6A is a detail view of the left end flange portion of FIG. 6.

As shown in FIGS. 6 and 7, the inner aperture 62 and outer aperture 64 are provided in each end flange 42 interior of the slots 58. Inner apertures 62 are provided for passage of device screws, such as those included with a duplex receptacle. Outer apertures are provided for passage of screws for a decorative electrical receptacle and decorative cover. The electrical box extender 20 further includes a front opening 80 at the outer edge 35 of the frame member 22 and an inner opening 82 formed by the inner edges 50 of the long sidewalls 30 and the inner edges 48 of the short sidewalls 28. As shown in FIG. 6A, the inner aperture 62 for accommodating a device screw and the outer aperture 64 for accommodating a decorative cover screw, are provided in each end flange 42 interior of the slots 58 and exterior of the rounded edge 66 at the juncture of the frame member 22 and each of the sidewalls.

Figure 4:
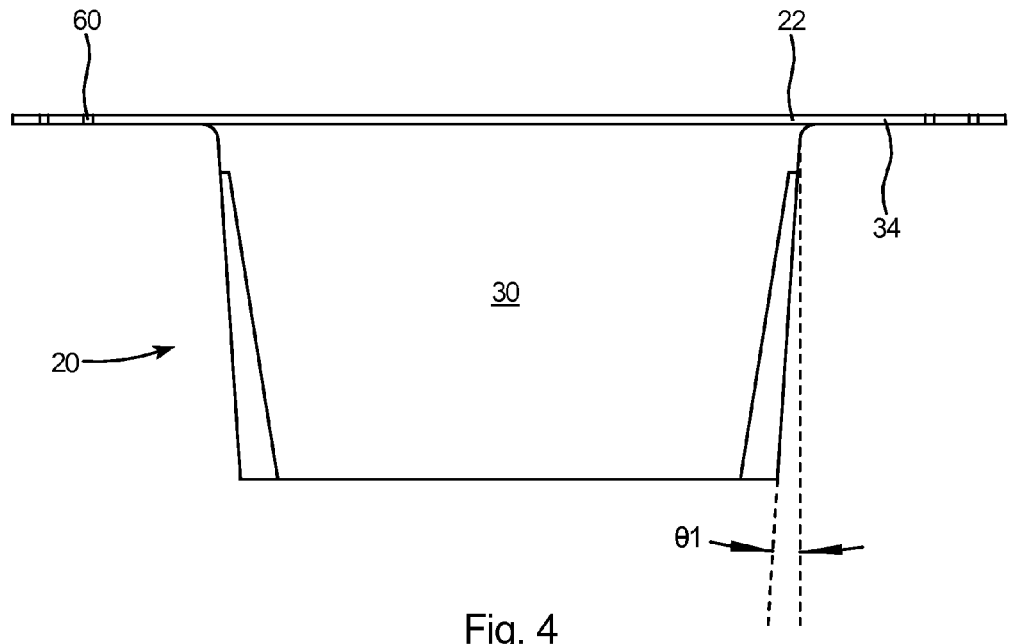
FIG. 4 is a side view of the electrical box extender.
Figure 5:
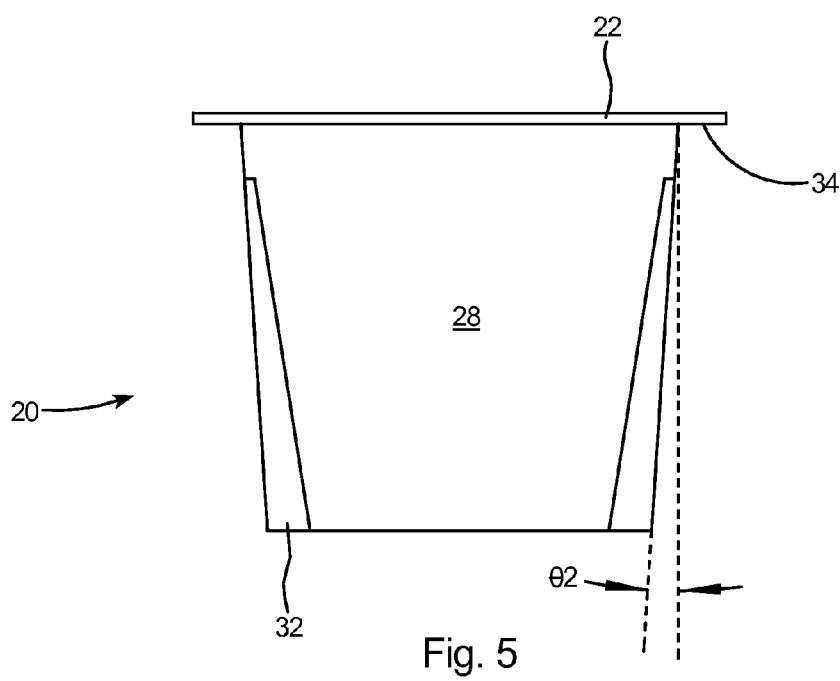
FIG. 5 is an end view of the electrical box extender.

As shown in FIGS. 4 and 5, the short sidewalls 28 and long sidewalls 30 preferably extend inward from the frame member 22 not orthogonally, but at a slight angle $\theta 1$ and $\theta 2$. The angle $\theta 1$ of the short sidewalls 28 and the angle $\theta 2$ of the long sidewalls 30 with respect to the frame member 22 and to the peripheral flange 34 is preferably between 1 and 6 degrees, more preferably between 2 and 5 degrees, and most preferably between 3 and 4 degrees as shown by angles $\theta 1$ and $\theta 2$ in FIGS. 4 and 5.

Figure 8:
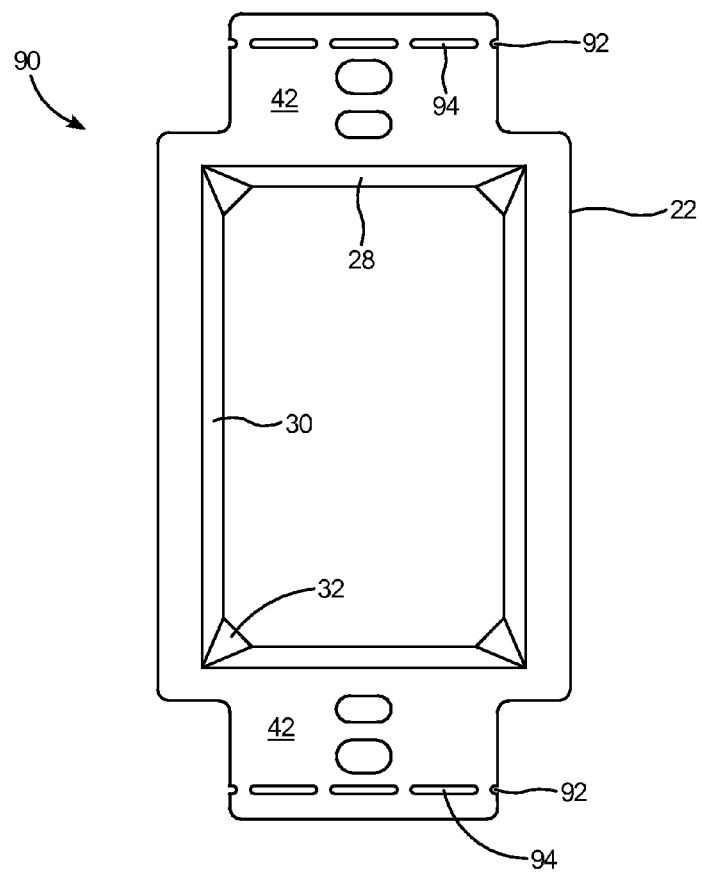
FIG. 8 is front elevation view of a second embodiment of the electrical box extender of the present invention.

Referring to FIG. 8, a second embodiment of the electrical box extender 90 includes a single pair of side notches 92 and one row 94 of axially-aligned slots 58 in axial alignment with the notches. The second embodiment of the electrical box extender 90 is adaptable to accommodate either standard electrical plates or mid-size electrical plates.

Figure 9:
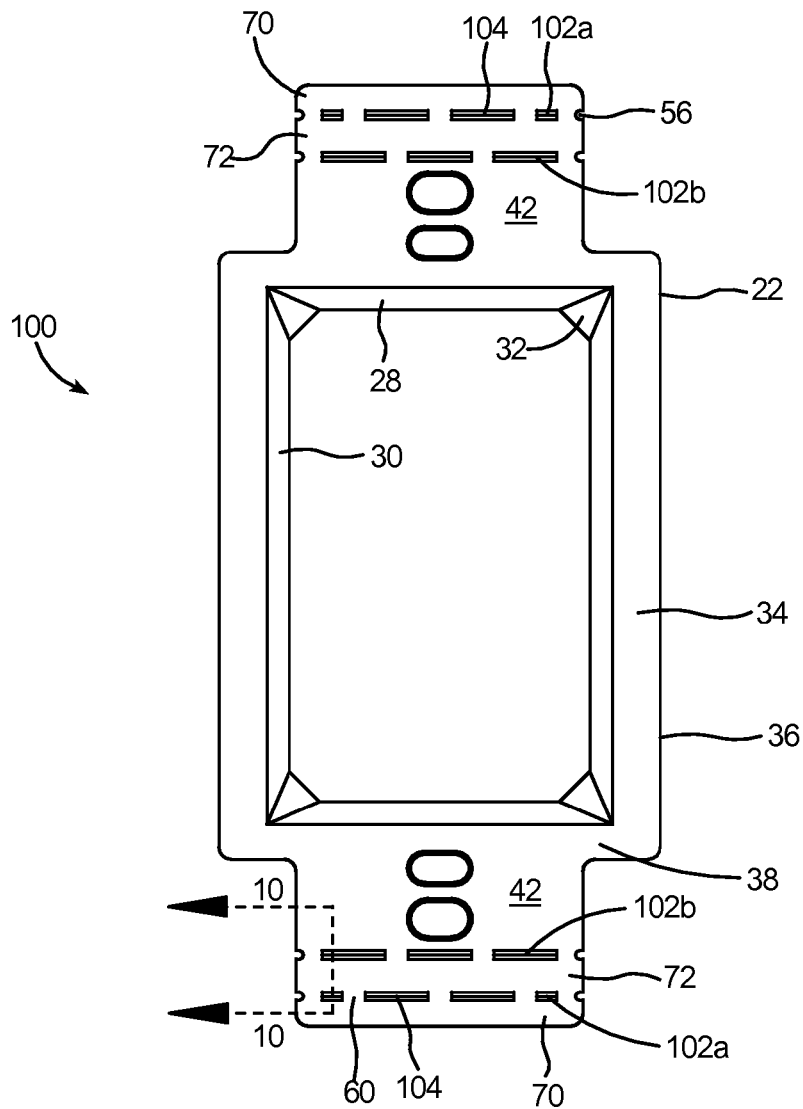
FIG. 9 is front elevation view of a third embodiment of the electrical box extender of the present invention.
Figure 10:
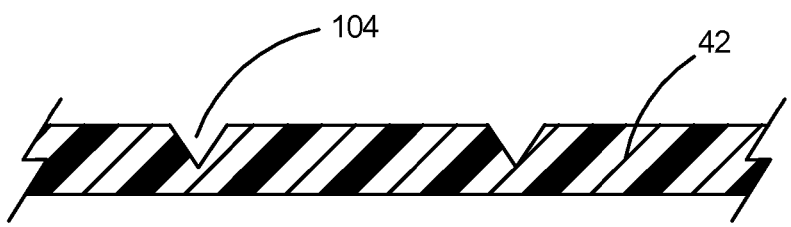
FIG. 10 is a sectional view of the end flange portion of electrical box extender taken along line 10-10 of FIG. 9.

With reference to FIGS. 9 and 10, a third embodiment of the electrical box extender 100 includes an outer row 102a and an inner row 102b of intermittent V-shaped grooves 104 extending across each end flange 42 with each of the rows 102a and 102b in axial alignment with corresponding notches 56 on each side of the end flange. The V-shaped grooves 104 of electrical box extender 100 create a first breakaway flange 70 and a second breakaway flange 72 on each end flange 42 and render the third embodiment of the electrical box extender 100 adaptable to accommodate either standard, mid-size, or max-size electrical plates. Narrow bridges 60 extend between adjacent V-shaped grooves 104. The bridges 60 in the outer row 102a of intermittent V-shaped grooves 104 are offset from the bridges in the inner row 102b of V-shaped grooves in order to maintain strength and integrity of the end flanges 42 across their total width, so that end flanges 42 maintain their strength and are not weakened unless purposely scored by an installer in order to remove one of the breakaway portions 70 or 72.

The electrical box extender of the present invention is preferably constructed of plastic and most preferably is molded in one piece of plastic. Appropriate plastic materials for construction of the box extender include polycarbonate, polyvinyl chloride, and nylon.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical box extender adaptable to fit cover plates of various sizes, comprising:
    a frame member including an outer edge;
    a peripheral flange extending along the outer edge of the frame member, said peripheral flange including a side portion, an end portion, and a planar rear surface;
    sidewalls extending from said rear surface of said peripheral flange;
    an end flange extending outward from said end portion of said peripheral flange, said end flange includes an outer edge and side edges;
    said side edges of said end flange including a pair of side notches therein;
    an outer row of slots and an inner row of slots in said end flange, each of said rows of slots in linear alignment with an associated pair of side notches;
    said outer row of slots and associated pair of end notches defining an outer breakaway flange portion on said end flange; and
    said inner row of slots and associated pair of end notches defining an inner breakaway flange portion,
    wherein removal of said outer breakaway flange portion adapts the electrical box extender for use with a mid-size electrical box cover plate and removal of said inner breakaway flange portion adapts the electrical box extender for use with a standard size electrical box cover plate.

2. The electrical box extender of claim 1, further comprising:
    a bridge on said end flange between each of said slots in said outer rows and inner rows of said linear aligned slots; and
    said bridges in said outer row of linear aligned slots are offset from said bridges in said inner row of linear aligned slots.

3. The electrical box extender of claim 1, further comprising:
    said sidewalls of said electrical box extender intersecting in a junction;
    a planar edge at said junction of said sidewalls, said planar edge is parallel to the planar rear surface of the frame member; and
    corner members extending between said sidewalls, said corner members extending from said planar edge of said junction.

4. The electrical box extender of claim 3, further comprising:
    inner edges on said corner members; and
    said corner members are narrow at said planar edge and gradually widen to their widest dimension at said inner edges of said corner members.

5. The electrical box extender of claim 4, further comprising:
    inner edges on said sidewalls; and
    said inner edges of said corners are planar with said inner edges of said sidewalls.

6. The electrical box extender of claim 4, wherein
    said sidewalls include base edges adjacent the peripheral flange; and
    said sidewalls are wide at said base edges and gradually narrow to their narrowest dimension at said inner edges of said sidewalls.

7. The electrical box extender of claim 1, wherein said sidewalls include short sidewalls and long sidewalls.

8. The electrical box extender of claim 1, wherein said notches in said pair of side notches are aligned 180 degrees apart on the side edges of the end flange.

9. The electrical box extender of claim 1, wherein said electrical box extender includes an open rear and said sidewalls of said electrical box extender terminate in a planar edge.

10. The electrical box extender of claim 1, wherein
    said electrical box extender is molded in one piece of plastic; and
    said sidewalls are capable of flexing inwardly to enable insertion of the electrical box extender into an existing electrical box to level the box extender and its electrical component with respect to a newly installed wall.

11. An electrical box extender adaptable to fit cover plates of various sizes, comprising:
    a frame member including an outer edge;
    a peripheral flange extending along the outer edge of the frame member, said peripheral flange including a side portion, an end portion, and a planar rear surface;
    sidewalls extending from said rear surface of said peripheral flange;
    an end flange extending outward from said end portion of said peripheral flange, said end flange including an outer edge and side edges;
    said side edges of said end flange including a pair of side notches therein;
    an outer row of intermittent V-shaped grooves and an inner row of intermittent V-shaped grooves in said end flange, each of said rows of V-shaped grooves in linear alignment with an associated pair of side notches;
    said outer row of V-shaped grooves and associated pair of end notches defining an outer breakaway flange portion on said end flange; and
    said inner row of V-shaped grooves and associated pair of end notches defining an inner breakaway flange portion,
    wherein removal of said outer breakaway flange portion adapts the electrical box extender for use with a mid-size electrical box cover plate and removal of said inner breakaway flange portion adapts the electrical box extender for use with a standard size electrical box cover plate.

12. The electrical box extender of claim 11, further comprising:
    said sidewalls of said electrical box extender intersecting in a junction;
    a planar edge at said junction of said sidewalls, said planar edge is parallel to the planar rear surface of the frame member; and
    corner members extending between said sidewalls, said corner members extending from said planar edge of said junction.

13. The electrical box extender of claim 12, further comprising:
    inner edges on said sidewalls;
    inner edges on said corner members; and said inner edges of said corner members are planar with said inner edges of said sidewalls.

14. The electrical box extender of claim 13, wherein said sidewalls include base edges adjacent the peripheral flange; and
said sidewalls are wide at said base edges and gradually narrow to their narrowest dimension at said inner edges of said sidewalls.

* * * * *